(No Model.)
B. McGREGOR.
DUMPING CART.
No. 337,011. Patented Mar. 2, 1886.
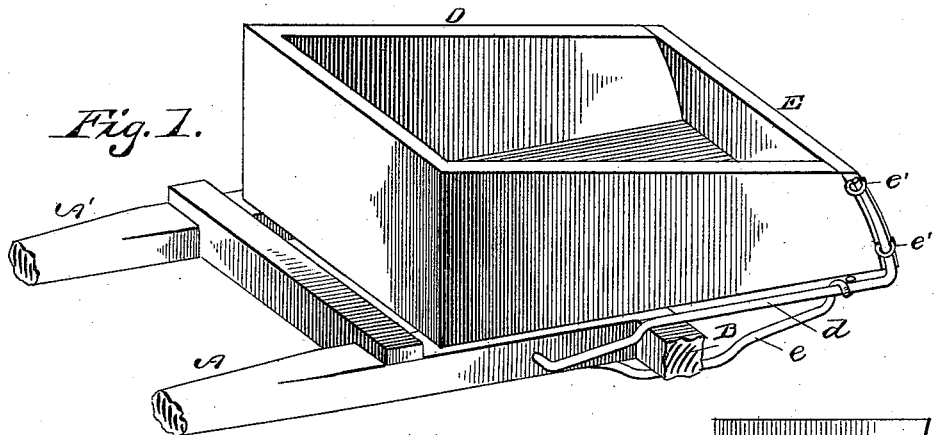
Fig. 1.
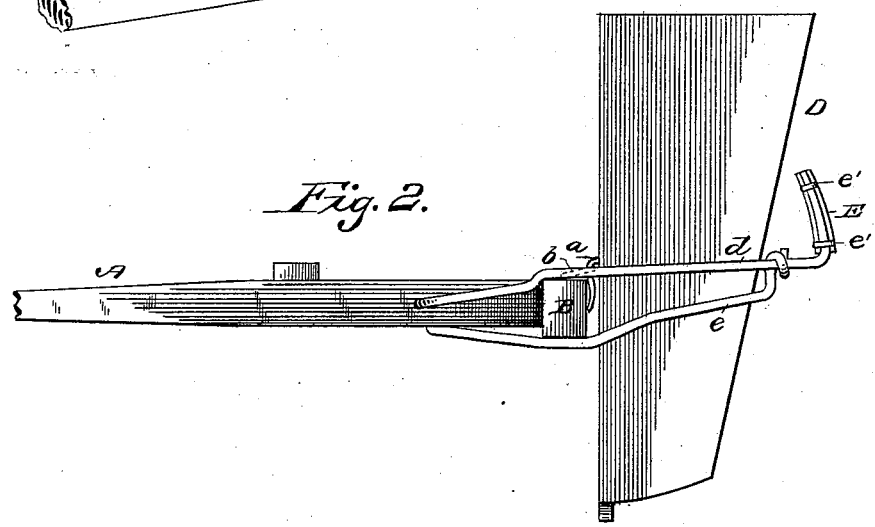
Fig. 2.
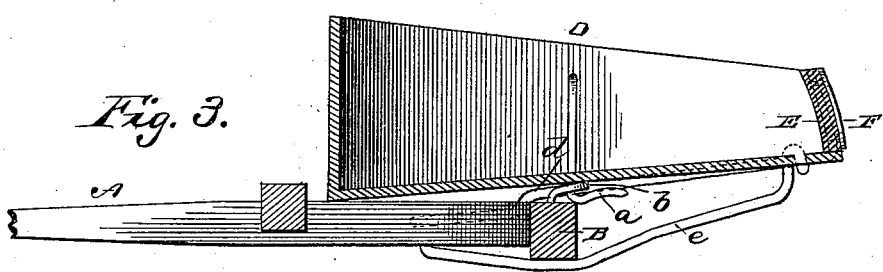
Fig. 3.
Fig. 4.
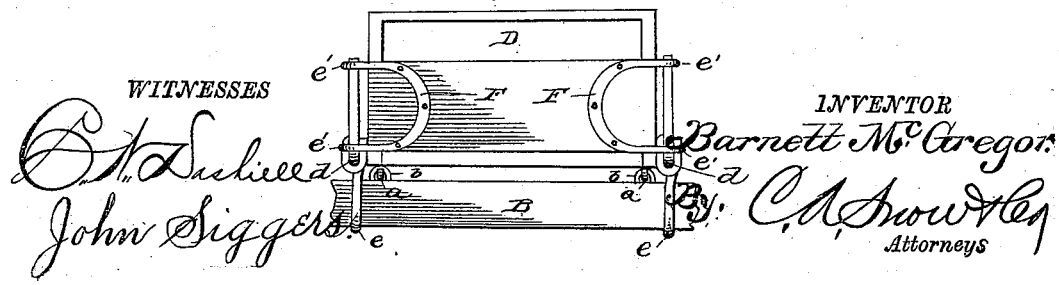
WITNESSES
INVENTOR
Barnett McGregor
By C. A. Snow & Co.
Attorneys

UNITED STATES PATENT OFFICE.

BARNETT McGREGOR, OF EARLINGTON, KENTUCKY.

DUMPING-CART.

SPECIFICATION forming part of Letters Patent No. 337,011, dated March 2, 1886.

Application filed July 28, 1885. Serial No. 172,901. (No model.)

*To all whom it may concern:*

Be it known that I, BARNETT MCGREGOR, a citizen of the United States, residing at Earlington, in the county of Hopkins and State of Kentucky, have invented a new and useful Improvement in Dumping-Carts, of which the following is a specification, reference being had to the accompanying drawings.

My invention relates to dumping carts or wagons, the object being to provide a stationary end or tail gate and improved means for supporting the same, whereby when the body of the cart is dumped the load will be discharged without the necessity of removing the said gate, thereby saving time and obviating the difficulty and annoyance usually experienced in removing the end-gate, especially when said gate or board becomes jammed or wedged by a heavy load within the cart, or from other causes.

With these ends in view the invention consists in the improved construction and combinations of parts hereinafter fully described, and pointed out in the claim.

In the drawings, Figure 1 is a perspective view of a dumping-cart embodying my invention. Fig. 2 is a side elevation showing the position of the parts when the body is lowered, and Fig. 3 is a vertical longitudinal section of Fig. 1. Fig. 4 is a rear end view showing the fitting of the end-gate or tail-board.

In the accompanying drawings, in which like letters of reference indicate corresponding parts in all the figures, A A' represent the shafts of an ordinary coal or dirt cart, which shafts are secured at their rear ends to the axle B.

D represents the body of the cart, which has an open rear end, and the sides of said body are made slanting—that is to say, they are deeper at their forward than at their rear ends, and gradually incline toward said rear end of the cart.

The body D is provided on its under side with hooks $a$, which are adapted to engage eyes or staples $b$, secured to the axle. By this construction it will be seen that the body of the cart may be readily tilted to dump a load. The body is hung upon the axle in such manner that its forward end is the heaviest, so that it will at all times be in a horizontal position, and whereby all possibility of the body accidentally dumping will be obviated. The cart is of about the same width as the distance between the shafts, so that it will rest upon and be supported by the same. Projecting rearwardly from the sides of the shafts are bars $d$, the ends of which are turned upwardly, and bracing said bars near their rear ends are rods $e$, which are secured at their other or forward ends to the under sides of the shaft.

E represents the tail-gate or end-board, secured to the outer sides of which, near the ends thereof, are U-shaped plates F, having eyes or loops $e'$ formed in their outer ends, said eyes or loops being adapted to be engaged by the upwardly-bent ends of the bars $d$, whereby the said gate or board is held in place.

The ends of the sides of the cart are beveled off, so as to allow the cart to dump, while the bottom of the cart projects under the end gate or board, so that a joint will be formed, which will prevent the escape of matter in the cart.

By the construction before described it will be seen that to discharge the load from the body of the cart it is only necessary to tilt the body, when the load will be dumped, and that as soon as the load is dumped the body will assume its normal position.

In most cases the load may be dumped without removing the end-gate. The construction shown by which the gate E is fitted to the bars $d$ enables the gate to be detached, if it is desired to do so.

In order to define the nature and scope of the present invention, I would state that heretofore it has been proposed to construct a dumping-wagon with side bars upon which the body is pivoted by a cross-bar, and having rearwardly-projecting arms in which are removably secured the end-gate. My invention differs from this, in the fact that I employ a cart-body which is larger at its front end than at its rear, whereby the body will automatically right itself when the load has been dumped. The body is pivoted upon the axle by eyes; and the end-gate is provided with plates having eyes, in which the ends of the rods are secured, thus providing a firm and strong support, while permitting the gate and its plates to be readily removed.

In order to define the nature and scope of the present invention, I would state that heretofore it has been proposed to provide a four-wheeled dumping-wagon with a frame having angular braces, a body pivoted on a rod bearing in said frame, rearwardly-extending arms connected and braced to said frame, and a tail or end gate having studs bearing in said arms and secured by a pin. My invention differs from this, in the fact that I employ two supporting-arms, b, connected to the shafts and provided with upturned rear ends, a brace-rod, e, connected to the shafts and the arms, and curved plates F, secured at each end of the end-gate, and having eyes projecting beyond the edges thereof, which are mounted in the upturned ends of the arms to detachably connect said end-gate thereto.

Having thus described my invention, I claim—

In a dumping-cart, the combination, with a hinged body, an axle, and the shafts, of rearwardly-extending arms $b$, secured at one end to the shafts, and having upturned rear ends, braces $e$, also secured to the shafts and extending beneath the axle and secured to the arms $b$ near their rear ends, a tail-board, E, rigidly held in the arms $b$, and curved plates F, secured at each end of the tail-board and having eyes $e'$, projecting beyond the tail-board and fitting the upturned ends of the arms $b$, to detachably connect the tail-board thereto, substantially as described.

In testimony that I claim the foregoing as my own I have hereto affixed my signature in presence of two witnesses.

BARNETT McGREGOR.

Witnesses:
JNO. T. ADAMS,
A. J. LISK, Sr.